United States Patent Office 3,479,336
Patented Nov. 18, 1969

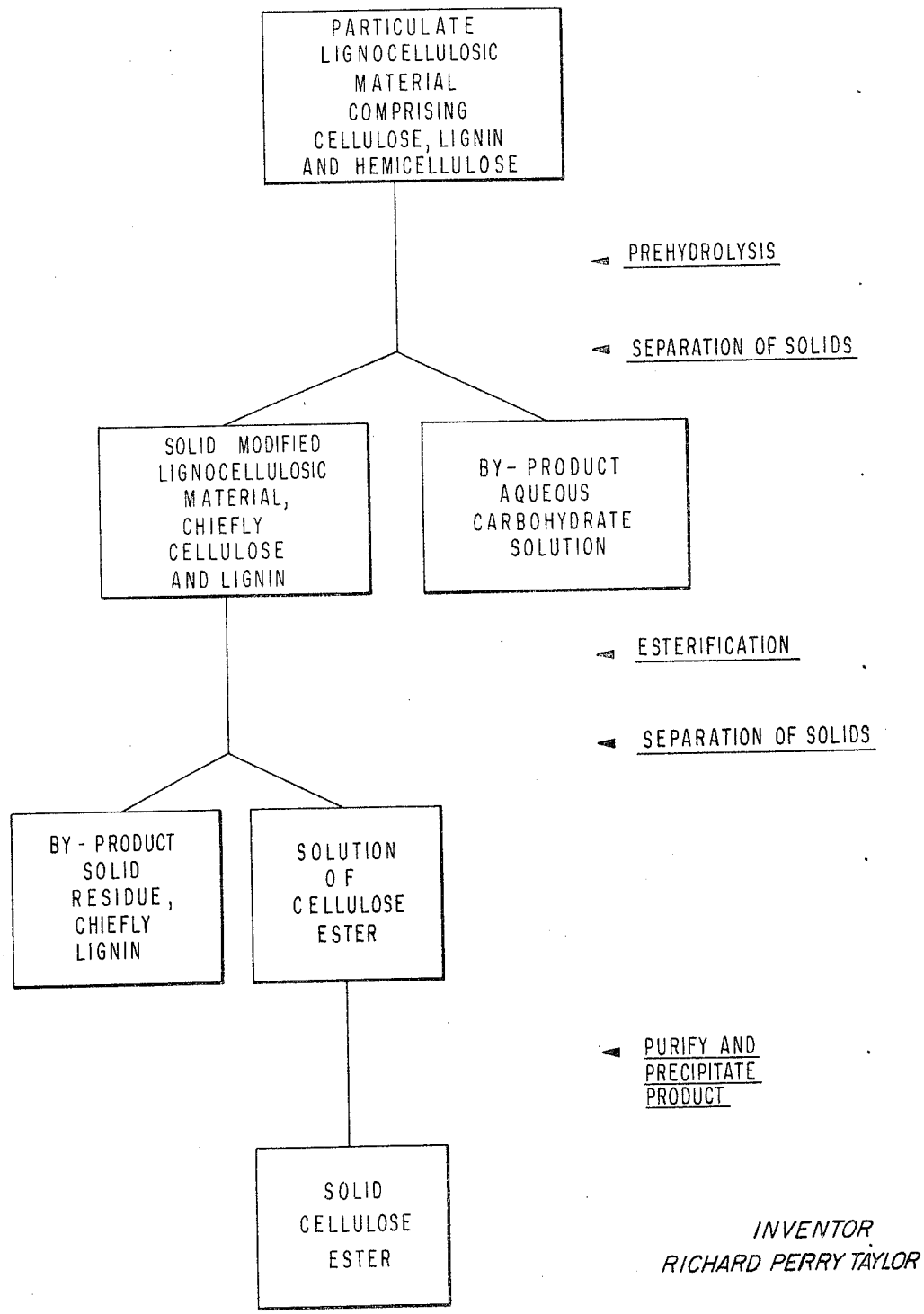

3,479,336
PRODUCTION OF CELLULOSE ESTERS FROM PARTICULATE LIGNOCELLULOSIC MATERIAL
Richard Perry Taylor, North Vancouver, British Columbia, and Derek Abson, Vancouver British Columbia, Canada, assignors to Columbia Cellulose Company Limited, St. Vancouver, British Columbia, Canada, a Canadian corporation
Filed May 13, 1966, Ser. No. 558,167
Int. Cl. C08b 3/06, 1/02, 3/16
U.S. Cl. 260—225                     12 Claims

ABSTRACT OF THE DISCLOSURE

The process for the production of cellulose organic acid esters comprising hydrolyzing in an aqueous solution a particulate lignocellulosic material which initially comprises cellulose, lignin and hemicellulose, separating out solid modified lignocellulosic material, esterifying the solid modified lignocellulosic material and finally recovering cellulose ester.

---

The present invention relates to the production of cellulose esters. More particularly, the invention concerns an improved process for forming and recovering cellulose organic acid esters which may utilize an inexpensive lignocellulosic source material.

According to the prior art processes for the high yield production of and recovery of cellulose esters, such as cellulose acetate, it has been deemed essential first to obtain cellulose in a relatively pure form, and subsequently to esterify the same. For instance, for many years relatively short cotton fibers, known as "cotton linters," have commonly been selected as a source material for the production of cellulose esters largely because of the extremely high cellulose content, e.g., about 90 percent by weight, offered by this material. Prior to the actual esterification of such materials, various impurities are commonly first removed by washing with dilute alkalis or acids to produce essentially pure cellulose.

Lignocellulosic materials, such as woods, have long been recognized as potential sources of cellulose which may be separated and subsequently esterified to produce relatively pure cellulose esters, such as cellulose acetate. In fact, in recent years softwoods have provided the bulk of the cellulose which is subsequently acetylated to produce cellulose acetate. The common technique for the recovery of cellulose from a lignocellulosic material has involved various chipping, pulping, and purification procedures whereby substantially all of the lignin and hemicellulose impurities present are dissolved and removed from the wood. Prior to actual acetylation, the resulting cellulose is commonly soaked in a lower aliphatic acid solution to swell the fibers of the same in an effort to render the same more accessible to chemical reaction. Extremely finely divided and more readily available lignocellulosic materials, such as sawdust, may be pulped only with considerable difficulty according to the prior art, and have consequently been used commercially to only a minor extent for the production of relatively impure cellulose.

While it is known that the direct acetylation of untreated wood in board or finely divided form will modify the properties of the wood and produce a substantial quantity of acetylated carbohydrates, a commercially practical method for recovering cellulose acetate produced by such an acetylation process has not been available. We have found by experimentation, for instance, that if solvent extraction using known solvents for cellulose acetate is attempted, a product is recovery in low yields which has an unusually low viscosity and is contaminated with a relatively high proportion of acetylated hemicelluloses. The bulk of the high grade cellulose present apparently remains somewhat chemically and/or physically bound in the wood or wood fragments, along with lignin as an insoluble residue. U.S. Patent No. 2,151,412, to Sherrard et al., discloses the preliminary swelling and acetylation of finely ground wood to produce a crude product which may be used in molding applications. While the direct acetylation of lignocellulosic board materials may advantageously improve the properties of the same, as disclosed in U.S. Patent No. 2,417,995, to Stamm et al., a commercially practical process for producing and recovering high quality cellulose acetate by the direct acetylation of lignocellulosic materials has not been available to industry in the past.

It is an object of the invention to provide an improved process for the high yield production and recovery of cellulose esters utilizing lignocellulosic source materials.

It is also an object of the present invention to provide an economical process for the production of cellulose esters which may utilize a wide variety of inexpensive source materials.

It is another object of the precent invention to provide an improved process for the production and recovery of cellulose acetate which does not require that cellulose be in a relative pure form prior to acetylation.

It is yet another object of the present invention to provide an improved process for the production of cellulose esters which also yields valuable by-products.

It is a further object of the present invention to provide a flexible process for the production of cellulose esters possessing a variety of physical properties.

It is also a further object of the invention to provide a rapid and efficient process for the production of cellulose acetate which requires a lesser over-all consumption of chemicals than prior processes and a relatively small plant capital investment.

It is another object of the invention to provide a process for the production of cellulose acetate using a lignocellulosic material as the cellulose source material which eliminates the need for preliminary pulping and purification and the attendant pulp liquor disposal procedures necessary to avoid water pollution.

It is still another object of the invention to provide a process for the production of cellulose acetate from wood which affords an improved yield of cellulose acetate and an improved utilization of the various wood components.

These and other objects, as well as the scope, nature, and utilization of the invention will be apparent from the following detailed description and appended claims.

The drawing illustrates a schematic flow diagram of an embodiment of the inventive process.

It has now been discovered that an improved process for the production of cellulose organic acid esters comprises prehydrolyzing a particulate lignocellulosic material, which initially comprises cellulose, lignin, and hemicellulose, to produce a solid modified lignocellulosic materia, and a by-product carbohydrate solution containing a substantial portion of the hemicellulose initially present in the material dissolved therein; sepaarting the solid modified lignocellulosic material from the carbohydrate solution; esterifying the solid modified lignocellulosic material with a carboxylic acid anhydride to produce a cellulose organic acid ester; and recovering the cellulose organic acid ester.

The term "lignocellulosic material," as used in the specification and appended claims, is equated with the term "lignocellulose," as defined in The Condensed Chemical Dictionary, sixth edition. Such material is formed from plant tissue compounds and contains cellulose, lignin, and hemicellulose in combined form. Both softwoods and hardwoods come within this definition. Illustrative examples of various softwoods which may be used in accordance with the present invention include hemlock, balsam, and spruce. Illustrative examples of various hardwoods which may be used in accordance with the present invention include cottonwood, aspen, birch and maple. Those species of woods are particularly preferred for use in the instant process which have a relatively high cellulose content in relation to the lignin and hemicellulose content. In addition to softwoods and hardwoods, other lignocellulosic materials, such as straw, grass, bagasse, and bamboo may likewise be utilized in the instant process.

The cellulose component of the lignocellulosic material is usually the predominant solid component present therein. Lignin, which serves as a binding material, and "hemicellulose" which identifies a group of polysaccharides other than cellulose commonly present in wood are the other major solid components. The table which follows summarizes the relative proportions of these compounds commonly encountered in woods.

|  | Softwoods | Hardwoods |
| --- | --- | --- |
| Percent cellulose | 40–44 | 40–53 |
| Percent lignin | 29–33 | 16–24 |
| Percent hemicellulose | 25–30 | 27–40 |

The lignocellulosic materials treated in accordance with the present invention are preferably divided into particulate form prior to the prehydrolysis step of the instant process. The particle sizes selected may be varied over a wide range. Particle sizes from about 1/20 inch to about 3/8 inch are preferred for treatment in accordance with the present invention. Particle sizes under 1/20 inch may also be utilized, but are not easily separated and retained during the various steps of the process by conventional screen filtration techniques. Likewise particles having a dimension in excess of 3/8 inch may be utilized. If the particle size much exceeds 1 inch then penetration and diffusion difficulties may be presented. The particularly preferred particle size range is about 1/8 inch to about 1/4 inch. Readily available sawdust of softwoods or hardwoods, as accumulated at sawmills, forms the preferred lignocellulosic material. This material is commonly available in many areas in large quantities and has hitherto been accorded little or no economic value, except as an inexpensive fuel for industrial purposes. It is, of course, possible to grind, to mill, or to chip wood to the desired particulate form, and subsequently to treat the wood according to the present invention should less expensive and previously divided lignocellulosic source materials not be utilized.

The prehydrolysis of wood chips prior to the submission of the same to kraft pulping processes has been utilized in the prior art. The pulping step in such processes effectively removes lignin present in the wood, and yields relatively pure cellulose in solid form. In the instant process for the production of cellulose esters, esterification of a lignocellulosic material is conducted following the initial prehydrolysis step, and time consuming delignification or pulping prior to esterification is avoided.

The prehydrolysis step of the instant process is believed to eliminate to a substantial degree the naturally occurring bonds present between the cellulose, lignin, and hemicellulose components of the raw lignocellulosic material. By controlling the pH and temperature conditions during the prehydrolysis step, it has been found that this result may be effectively accomplished without the concomitant undue degradation of the cellulose component. The hydrolysis step accordingly renders the cellulose component highly accessible to subsequent esterification and subsequent product recovery. The cellulose and lignin components tend to remain in solid form during the hydrolysis step and are accordingly modified as described above. Also, the lignin present in the wood tends to coalesce as condensed lignin of reduced solubility during the prehydrolysis step, and may be efficiently separated according to the instant process. A by-product carbohydrate solution is also formed which contains a substantial portion of the hemicellulose originally present in the lignocellulosic material in dissolved form. Both the pentosan and hexosan components of hemicellulose tend to pass into solution during the prehydrolysis step. Hemicellulose molecules of shorter chains are produced which are further degraded by acid hydrolysis to simple sugars and other decomposition products.

The hydrolysis step is preferably conducted in an aqueous medium which is initially approximately neutral to moderately acidic for between about 60 to about 150 minutes. A liquor to lignocellulosic material ratio of at least about 10:1 has been found to enable efficient agitation of the mass and the removal of soluble solids from the material, and to minimize local overheating. For best results, it is recommended that the ratio by weight of aqueous medium to particulate lignocellulosic material be between about 10:1 and about 30:1. A ratio in excess of about 30:1 may also be utilized but require the handling of unnecessarily large quantities of liquor.

In preferred embodiments of the present invention, the initial pH is adjusted to a value between about 2 and about 7 by the introduction of a suitable quantity of a mineral or organic acid into the system. Illustrative mineral acids for initially adjusting the pH include sulfuric acid, hydrochloric acid, phosphoric acid and sulfurous acid. An illustrative organic acid which may be utilized is acetic acid. It is recommended that an initial pH much below the moderate value of about 2 not be selected since extremely low pH conditions tend to promote excessive degradation of the cellulose component. An aqueous solution containing about 0.2 percent by weight sulfuric acid and having an initial pH of about 2 has been found to produce particularly satisfactory results. Is desired, an initial pH value slightly above about 7, i.e. about 8–9, may be selected when one wishes to employ relatively mild prehydrolysis conditions. In such instances the pH will drop during the prehydrolysis step due to the formation of acetic acid. When the aqueous phase is adjusted to the lower end of the pH range, e.g. about 2, the pH tends to rise during the prehydrolysis step, since a quantity of acid is believed to combine with the wood to a minor extent. Common pH values encountered at the end of the prehydrolysis step of the constant process are between about 2.5 and 3.7.

The preferred temperature range for conducting the pre-hydrolysis step is between about 130° C. and about 220° C. If temperatures much below 130° C. are selected, the hydrolysis tends to incompletely modify the lignocellulosic material unless conducted for extended periods of time. While temperatures in excess of about 220° C. may be utilized in some instances, there is a tendency for the wood to undergo extensive decomposition at such elevated temperatures. The particularly preferred temperature range for the present process is between about 170° C. and about 200° C. Since, in each preferred embodiment of the invention, temperatures in excess of 100° C. are utilized, the hydrolysis step is conducted in a closed reaction zone.

If vigorous hydrolysis conditions are selected, the product tends to possess a lesser degree of naturally occurring polymerization, and produces a solution of reduced viscosity when dissolved in a suitable solvent. Therefore, by a selection of such variables as initial pH, hydrolysis temperature, and duration of the hydrolysis step, the present invention provides those skilled in the art a flexible process which yields products of varying physical properties.

Following prehydrolysis of the particulate lignocellulosic material, the solid modified lignocellulosic material is separated from the carbohydrate solution by any suitable technique. The separation may be suitably accomplished by filtration or by centrifugation.

The resulting carbohydrate solution is considered to be a valuable by-product of the instant process. For instance, it has been found that from about 1 to 3 percent by weight of the carbohydrate solution is composed of sugars which may serve as a substrate for fermentation or oxidation to ethanol, acetic acid, propionic acid, etc., or as a growth medium for yeasts used in high protein food production. The chief sugars present in the solution are: glucose, mannose and xylose. Such sugars are derived largely from the hydrolysis of pentosans and hexosans which were originally bound in the lignocellulosic material as hemicellulose. Since the hemicellulose is much more readily hydrolyzed than cellulose, a substantial portion of this material passes into solution during the prehydrolysis step described above, and leaves behind the solid modified lignocellulosic material.

Prior to esterification it is desirable that substantially all of the water be removed from the solid modified lignocellulosic material so that an excessive consumption of the organic carboxylic anhydride is avoided. Such water removal may be effectively accomplished by any one of the following techniques: (a) hot air drying, (b) extraction with an organic acid such as acetic acid which is replaced by fresh acetic acid prior to acetylation, or (c) extraction with a volatile solvent such as acetone or benzene which may be removed by evaporation prior to esterification.

The solid modified lignocellulosic material is next esterified to produce any one of a variety of cellulosic organic acid esters. Organic carboxylic acid anhydrides, such as acetic anhydride, propionic anhydride, and butyric anhydride, may be utilized, either as the sole esterification agent or in combination with other anhydrides. Specific illustrative examples of cellulose esters which may be produced according to the present invention include cellulose acetate, cellulose propionate, cellulose acetate butyrate, cellulose propionate, and cellulose butyrate. Conventional esterification procedures employing a catalyst and inert solvent or solvent mixture may be utilized. Suitable catalysts include sulfuric acid, perchloric acid, or mixtures thereof. Suitable solvents include acetic acid, methylene chloride, and chloroform.

Cellulose acetate is the preferred cellulose ester which may be produced according to the present invention. If one elects to conduct esterification in the presence of a single solvent, such as acetic acid, then it is possible for substantial additional quantities of cellulose ester to be recovered through conventional extraction techniques from the solid residue following esterification. In a particularly preferred embodiment of the invention, cellulose triacetate may be formed utilizing the combination of acetic anhydride, acetic acid, methylene chloride, and an acid catalyst. Perchloric acid in a concentration between about 0.05 and about 0.25 percent by weight of the modified lignocellulosic material is the preferred catalyst and has been found to produce a produce in slightly better yield and possessing a higher acetyl value than other more common catalysts, such as sulfuric acid. Other preferred esterification reaction conditions include a weight ratio of acetic anhydride to acetic acid between about 0.5:1 and about 1.5:1, a reaction period between about 0.5 and about 5.0 hours, and a reaction temperature between about 20° C. and about 60° C.

Since the esterification mixture tends to become viscous as the reaction progresses, efficient agitation of the reactants is recommended. Also, procedures for controlling the temperature rise of this exothermic reaction are advantageously employed to aid in the formation of a homogeneous product. Suitable temperature control procedures include one or more of the following: (a) gradual addition of the anhydride/catalyst mixture, (b) cooling of the anhydride/catalyst mixture prior to addition, and (c) external cooling of the reaction vessel.

The esterification reaction is desirably terminated before the isolation of the cellulose ester by neutralization of the catalyst with a suitable base such as sodium acetate.

During the esterification reaction, the lignin originally present within the modified lignocellulosic material is esterified and largely retains its solid form while a substantial amount of the cellulose ester product passes into solution. Following esterification, the solution of dissolved cellulose ester is separated from the solid residue. This solid residue may be conveniently separated from the product solution by filtration or by centrifugation. Centrifugation is the preferred separation technique. Alternatively, the whole of the reaction mixture may be poured into hot water to form a precipitate which is separated as a solid, dried, and extracted with a suitable solvent for the cellulose ester such as methylene chloride. The extraction may be accomplished by stirring the precipitate with the solvent followed by the centrifuging or filtering of the extraction mixture, or by any other suitable extraction technique.

If desired, the cellulose ester solution produced during the esterification step of the instant process may be purified with an oxidizing agent to remove any residual amounts of lignin present therein. Suitable oxidizing agents include peracetic acid, chlorine dioxide, sodium chlorite, and hydrogen peroxide. The solid cellulose ester product may next be precipitated into water, separated and dried to produce a solid product. Alternatively, the cellulose ester may be precipitated into water and subsequently purified.

The cellulose ester product may be partially hydrolyzed, as is common according to the prior art, in order to modify the properties thereof, such as the solubility in certain solvents. For example, upon completion of the initial esterification reaction, water may be added to convert all the acetic anhydride to acetic acid, and additional water added to give a concentration of from 5 to 20 percent by weight. The mixture may then be maintained under suitable conditions of time and temperature and subsequently poured into an excess of hot water in order to precipitate a solid, from which cellulose acetate may be isolated by solvent extraction. In this manner it is possible for a cellulose acetate ester such as cellulose secondary acetate as well as cellulose triacetate to be produced according to the present invention.

The solid by-product which is initially separated from the solution containing the dissolved cellulose ester product is readily formable and finds utility in the manufacture of wood products as well as other applications. Such solid residue is particularly suited for use as a molding resin or as an adhesive. If the initial prehydrolysis reaction is incomplete, then it is possible for the properties of this by-product to be advantageously modified by the presence of appreciable quantities of cellulose ester bound to the formable lignin component.

The following examples are given as specific illustrations of the invention. It should be understood, however, that the invention is not limited to the specific details set forth in the examples.

EXAMPLE I

Hemlock sawdust was screened to remove particles retained by a ¼ inch mesh screen. One hundred parts by weight of dry solids which passed through the screen and having an approximate composition on an extractives-free basis of 45 parts of cellulose, 30 parts of lignin and 25 parts of hemicellulose were mixed in a stainless steel pressure vessel with sufficient water to give a liquid to solids ratio of 10:1. The initial pH of the liquid phase was 5.6. The vessel was rapidly heated to 190° C. and maintained at this temperature for 2 hours, with continual rotation to agitate the contents. The vessel and contents were then cooled and the solid modified particulate material remaining in the vessel after the prehydrolysis stage was separated from the liquid, which had a pH value of 3.7 and which contained about 15 parts by weight of fermentable sugars. After thorough washing with water and drying to a low moisture content the solid weighed about 70 parts on a dry basis and had a composition by weight of approximately 30 parts of lignin and 40 parts of cellulose.

A quantity of sawdust, treated as described above, containing 10 parts of the dry modified solids, was soaked in glacial acetic acid to remove residual water. After filtering and pressing, additional acetic acid was added to give a total of 20 parts by weight, and 80 parts by weight of ethylene chloride was then added. The solid was acetylated by adding a mixture of 20 parts by weight of acetic anhydride and 0.01 part by weight of perchloric acid. The mixture was kept at 30° C., with stirring, for 3 hours. Sodium acetate was then added to neutralize the acid catalyst, the mixture diluted with additional quantities of methylene chloride and centrifuged to separate a pale colored liquid and a dark brown finely divided solid consisting largely of lignin. The liquid phase containing dissolved cellulose triacetate was mixed with hot water to precipitate a pale buff colored solid. This was stirred with a hot aqueous solution of chlorine dioxide, washed with water and dried to give about 8 parts by weight of a white solid containing not less than 97 percent cellulose triacetate. The acetyl value of the product was 61.5 percent (as acetic acid), and the intrinsic viscosity (measured on the regenerated cellulose in cupric-ethylenediamine solution) was 1.5 to 1.7.

EXAMPLE II

Cottonwood sawdust containing 100 parts by weight of dry solids, comprising about 56 parts of cellulose, 24 parts of lignin and 20 parts of hemicellulose, was pretreated in an aqueous medium under conditions essentially similar to those described under Example I, to give about 72 parts of a particulate material of which about 22 parts were lignin and about 50 parts were cellulose.

Acetylation of 10 parts of this material accompanied by separation of dissolved cellulose acetate from residual lignin and final purification with aqueous chlorine dioxide solution, as described in Example I, gave about 11 parts of essentially pure celluose triacetate.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the production of cellulose organic acid esters comprising hydrolyzing in an aqueous solution which is initially approximately neutral to moderately acidic at about 130° C. to about 220° C. a particulate lignocellulosic material which initially comprises cellulose, lignin, and hemicellulose, to produce a solid modified lignocellulosic material and a by-product carbohydrate solution containing a substantial portion of the hemicellulose initially present in said material dissolved therein; separating said solid modified lignocellulosic material from said carbohydrate solution; esterifying said modified lignocellulosic material with a carboxylic acid anhydride or mixtures thereof to produce a cellulose organic acid ester; and recovering said cellulose organic acid ester.

2. A process according to claim 1 in which the particulate lignocellulosic material is wood.

3. A process according to claim 1 in which the carboxylic acid anhydride is acetic anhydride.

4. A process according to claim 1 in which the carboxylic acid anhydride is a mixture of acetic anhydride and propionic anhydride.

5. A process according to claim 1 in which the carboxylic acid anhydride is a mixture of acetic anhydride and butyric anhydride.

6. A process for the production of cellulose triacetate comprising hydrolyzing in an aqueous solution which is initially approximately neutral to moderately acidic at about 130° C. to about 220° C. a particulate lignocellulosic material which initially comprises cellulose, lignin, and hemicellulose, to produce a solid modified lignocellulosic material and a by-product carbohydrate solution containing a substantial portion of the hemicellulose initially present in said material dissolved therein; separating said solid modified lignocellulosic material from said carbohydrate solution; acetylating said solid modified lignocellulosic material in the presence of a solvent for cellulose triacetate to produce a solution of cellulose triacetate and a solid residue composed primarily of lignin; and recovering solid cellulose triacetate from said solution of cellulose triacetate.

7. A process according to claim 6 in which the particulate lignocellulosic material is wood.

8. A process according to claim 6 in which perchloric acid is employed as a catalyst for the acetylation of the solid modified lignocellulosic material.

9. A process according to claim 6 in which the solvent for cellulose triacetate is acetic acid and methylene chloride.

10. A process according to claim 6 in which solid cellulose triacetate is recovered from said solution of cellulose triacetate by precipitation from an aqueous solution.

11. A process according to claim 6 which includes the further step of bleaching the cellulose triacetate with an oxidizing agent to remove residual amounts of lignin present therein.

12. A process for the production of cellulose secondary acetate comprising hydrolyzing in an aqueous solution which is initially approximately neutral to moderately acidic at about 130° C. to about 220° C. a particulate lignocellulosic material which initially comprises cellulose, lignin, and hemicellulose, to produce a solid modified lignocellulosic material and a by-product carbohydrate solution containing a substantial portion of the hemicellulose initially present in said material dissolved therein; separating said solid modified lignocellulosic material from said carbohydrate solution; acetylating said solid modified lignocellulosic material in the presence of a solvent for cellulose triacetate to produce a solution of cellulose triacetate and a solid phase composed primarily of lignin; hydrolyzing said cellulose triacetate substantially to cellulose secondary acetate; and recovering said cellulose secondary acetate.

References Cited

UNITED STATES PATENTS

| 2,838,488 | 6/1958 | Titchen | 260—229 |
| 2,827,455 | 3/1958 | Wells et al. | 260—229 |
| 2,603,636 | 7/1952 | Martin | 260—229 |

FOREIGN PATENTS 926,034 5/1963 Great Britain.

HOSEA E. TAYLOR, JR., Primary Examiner
R. W. GRIFFIN, Assistant Examiner

U.S. Cl. X.R.
162—71; 260—227, 229

PO-1050
(5/69)

UNITED STATES PATENT OFFICE
CERTIFICATE OF CORRECTION

Patent No. 3,479,336   Dated November 18, 1969

Inventor(s) R. P. Taylor et al

It is certified that error appears in the above-identified patent and that said Letters Patent are hereby corrected as shown below:

Column 2, line 22, "precent" should read ---present---
Column 2, line 25, "relative" should read ---relatively---
Column 2, line 59, "sepaarting" should read ---separating---
Column 3, line 18, "compounds" should read ---components---
Column 4, line 46, "constant" should read ---instant---
Column 5, line 56, "produce", second occurrence, should read ---product---
Column 7, line 64, the word "solid" was omitted before the word "modified"
Column 8, line 36, the word "product" was omitted before the word "with"

SIGNED AND
SEALED
JUN 2 1970

(SEAL)
Attest:

Edward M. Fletcher, Jr.
Attesting Officer

WILLIAM E. SCHUYLER, Jr.
Commissioner of Patents